United States Patent
Cheng et al.

(10) Patent No.: US 11,050,535 B2
(45) Date of Patent: Jun. 29, 2021

(54) METHOD AND APPARATUS FOR PERFORMING SIDELINK COMMUNICATION IN WIRELESS COMMUNICATION SYSTEMS

(71) Applicant: FG Innovation Company Limited, Tuen Mun (HK)

(72) Inventors: Yu-Hsin Cheng, Hsinchu (TW); Yung-Lan Tseng, Hsinchu (TW); Hung-Chen Chen, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 95 days.

(21) Appl. No.: 16/535,503

(22) Filed: Aug. 8, 2019

(65) Prior Publication Data

US 2020/0052843 A1 Feb. 13, 2020

Related U.S. Application Data

(60) Provisional application No. 62/716,626, filed on Aug. 9, 2018.

(51) Int. Cl.
*H04W 72/04* (2009.01)
*H04L 5/00* (2006.01)

(52) U.S. Cl.
CPC ....... *H04L 5/0048* (2013.01); *H04W 72/0406* (2013.01)

(58) Field of Classification Search
CPC ............ H04W 72/0406; H04W 72/12; H04W 74/0833; H04W 4/40; H04L 5/0048; H04B 7/0413
See application file for complete search history.

(56) References Cited

U.S. PATENT DOCUMENTS

| | | | |
|---|---|---|---|
| 10,666,334 B2* | 5/2020 | Xiong | H04L 5/0048 |
| 2017/0223686 A1 | 8/2017 | You et al. | |
| 2018/0020441 A1* | 1/2018 | Lo | H04W 72/044 |
| 2018/0034609 A1* | 2/2018 | Kim | H04L 5/0023 |
| 2018/0062809 A1 | 3/2018 | Baghel et al. | |

FOREIGN PATENT DOCUMENTS

| | | |
|---|---|---|
| CN | 108111253 A | 6/2018 |
| WO | 2018097947 A2 | 5/2018 |

* cited by examiner

*Primary Examiner* — Wei Zhao
(74) *Attorney, Agent, or Firm* — ScienBiziP, P.C.

(57) ABSTRACT

A method performed by a user equipment (UE) includes receiving a Sidelink Control Information (SCI) message including Demodulation Reference Signal (DMRS) related information. The DMRS related information includes at least one of DMRS sequence generation information, a number of DMRSs, a DMRS time/frequency location, a DMRS port index, a DMRS port group index, and a type of DMRS pattern.

22 Claims, 6 Drawing Sheets

METHOD AND APPARATUS FOR PERFORMING SIDELINK COMMUNICATION IN WIRELESS COMMUNICATION SYSTEMS

CROSS-REFERENCE TO RELATED APPLICATION(S)

The present application claims the benefit of and priority to a provisional U.S. Patent Application Ser. No. 62/716, 626, filed on Aug. 9, 2018, entitled "Method and Apparatus for sidelink information indicator in Vehicle communication," (hereinafter referred to as "US74709 application"). The disclosure of the US74709 application is hereby incorporated fully by reference into the present application.

FIELD

The present disclosure generally relates to wireless communications, and more particularly, to methods and apparatuses for performing Sidelink (SL) communications in a wireless communication system (e.g., a Vehicle-to-everything (V2X) communication system).

BACKGROUND

Various efforts have been made to improve different aspects of wireless communications (e.g., data rate, latency, reliability, mobility, etc.) for the next generation (e.g., 5G New Radio (NR)) wireless communication systems. Among these efforts, one area of interest for further development in the next generation wireless communication systems is Device-to-Device (D2D) communications, which may include V2X and Vehicle-to-Vehicle (V2V) communications. For D2D communications, devices may communicate directly with each other via SL connections.

In order to support advanced D2D (e.g., V2X) services, the next generation wireless communication systems may need to meet certain requirements. For example, an NR wireless communication system may need to have a flexible design in support of V2X services with low latency and high reliability requirements. However, the related signaling mechanism for SL communications has not been widely discussed.

Therefore, there is a need in the art for methods and apparatuses for performing SL communications in a V2X communication system.

SUMMARY

The present disclosure is directed to methods and apparatuses for performing SL communication in a wireless communication system.

According to an aspect of the present disclosure, a User Equipment (UE) is provided. The UE includes one or more non-transitory computer-readable media having computer-executable instructions embodied thereon and at least one processor coupled to the one or more non-transitory computer-readable media. The at least one processor is configured to execute the computer-executable instructions to receive a Sidelink Control Information (SCI) message including Demodulation Reference Signal (DMRS) related information. The DMRS related information includes at least one of DMRS sequence generation information, a number of DMRSs, a DMRS time/frequency location, a DMRS port index, a DMRS port group index, and a type of DMRS pattern.

According to another aspect of the present disclosure, a method performed by a UE is provided. The method includes receiving an SCI message including DMRS related information. The DMRS related information includes at least one of DMRS sequence generation information, a number of DMRSs, a DMRS time/frequency location, a DMRS port index, a DMRS port group index, and a type of DMRS pattern.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
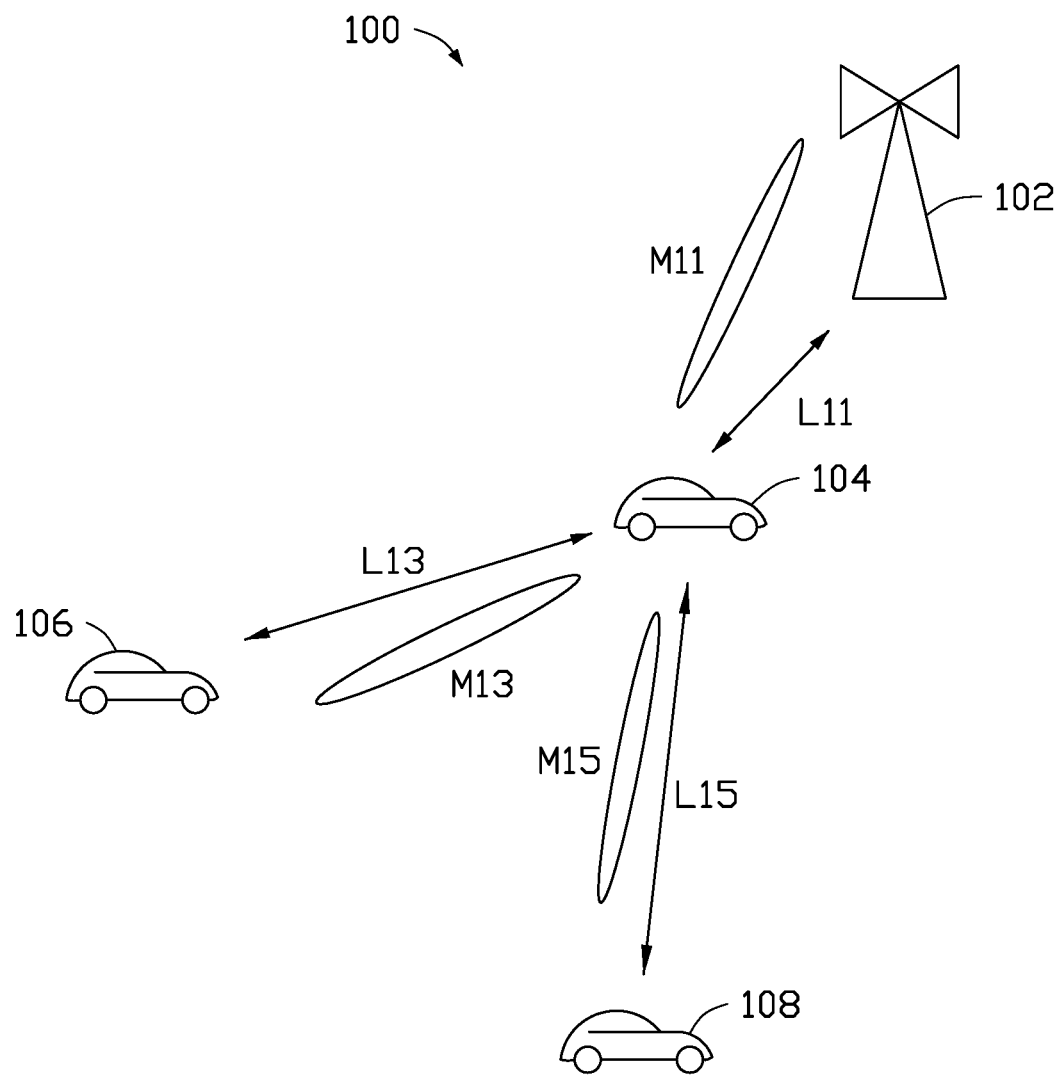
FIG. 1 is a schematic diagram illustrating beam operations of a V2X communication system, in accordance with example implementations of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some implementations of the present disclosure, not shown) by numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station (BS), at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM EDGE Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved node B (eNB) as in the LTE or LTE-A, a radio network controller (RNC) as in the UMTS, a Base Station Controller (BSC) as in the GSM/GERAN, a ng-eNB as in an E-UTRA BS in connection with the 5GC, a next generation Node B (gNB) as in the 5G-RAN, and any other apparatus capable of controlling radio communication and managing radio resources within a cell. The BS may connect to serve the one or more UEs through a radio interface to the network.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate SL resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, and B exists alone. In addition, the character "/" herein generally represents that the former and latter associated objects are in an "or" relationship.

As noted above, an NR system may be expected to have a flexible design in support of services with low latency and high reliability requirements. The NR system may be also expected to have a higher system capacity and a better coverage than a legacy system. In addition, the flexibility of NR SL framework may allow easy extension of the NR system to support future development of the advanced V2X services among other services.

In order to introduce beam-based operations for Frequency Range 1 (FR1) and Frequency Range 2 (FR2) common designs, some of the present implementations may provide improved content for a Downlink Control Information (DCI) message and/or a Sidelink Control Information (SCI) message.

Moreover, some V2X applications may require high reliability performance Hence, some of the present implementations may provide higher reliability for DCI transmissions, SCI transmissions and PSSCH transmissions, for example, not only in time and frequency domains, but also in spatial domain.

FIG. 1 is a schematic diagram illustrating beam operations of a V2X communication system, in accordance with example implementations of the present disclosure. As shown in FIG. 1, the V2X communication system 100 may include a BS 102 and several UEs (e.g., UEs 104, 106 and 108). It should be noted that even though three UEs 104, 106 and 108 are included in the example implementation illustrated in FIG. 1, any number of UEs may communicate with each other in some other implementations of the present application.

The UE 104 may communicate with the BS 102 via an Uplink (UL) and/or a Downlink (DL) connection of a V2X-Uu interface L11. For example, the UE 104 may monitor a beam (or a Reference Signal (RS)) M11 on the V2X-Uu interface L11 based on the beam information configured in a Control Resource Set (CORESET) configuration. The UE 104 may further communicate with other UEs 106 and 108 via SL PC5 interfaces L13 and L15, respectively. In addition, the UE 104 may apply beamforming technology to generate beams M13 and M15 to perform directional transmissions and receptions with the UEs 106 and 108.

Techniques related to the design of SCI messages of a V2X communication system are now described in the following.

Beam-Related SCI Messages

In some implementations of the present disclosure, spatial-domain-filter-related information may be included in an SCI message (e.g., SCI format NR_V or SCI_NR_V) to indicate to a receiver the spatial domain filter for transmission and/or reception. The spatial-domain-filter-related information may include at least one of the beam-related information, Transmission Configuration Indication (TCI) state information, and Quasi-Co-Location (QCL) information. For example, an SCI message (e.g., SCI format NR_V or SCI_NR_V) for scheduling a Physical Sidelink Shared Channel (PSSCH) may contain the aforementioned spatial-domain-filter-related information.

In some implementations of the present disclosure, one or more RS indices may be included in an SCI message (e.g., SCI format NR_V or SCI_NR_V) to indicate to a UE to receive a PSSCH scheduled by the Physical Sidelink Control Channel (PSCCH) based on the same spatial domain filter for receiving the RSs indicated by the RS indices.

In some implementations of the present disclosure, a UE may apply the most recent spatial domain filter of the indicated RSs to receive a PSSCH scheduled by a PSCCH. In some implementations of the present disclosure, if a UE has not yet received the RSs which are indicated in an SCI message, the spatial domain filter applied by the UE may depend on the UE implementation. In some implementations of the present disclosure, the RSs may include synchronization signals which are generated and transmitted by the UE transmitting the PSCCH.

In some implementations of the present disclosure, when an indicator (e.g., same-beam indicator) is set as "true/enabled," a UE may receive a PSSCH by using the same spatial domain filter as the one used for receiving a PSCCH (e.g., carrying an SCI message with the scheduling information for the PSSCH). The indicator may be contained in an RRC configuration (e.g., an SL-RRC configuration or a Uu-RRC configuration), a pre-configuration parameter, or in the BS-broadcast system information (e.g., received on an anchor carrier or a resource pool scheduled by the SCI message). For example, when a same-beam indicator which is configured for a resource pool is set as "true," the SCI message may indicate to the UE to transmit the PSSCH in the resource pool. In such a case, the UE may determine that the PSCCH and the scheduling PSSCH (e.g., the PSSCH scheduled by the PSCCH) may apply the same RX spatial domain filter.

RSs in V2X Communication Systems

In some implementations of the present disclosure, DMRS-related information may be included in an SCI message for the scheduling PSSCH. The DMRS-related information may include at least one of the DMRS sequence generation information, the number of DMRS symbols, a DMRS time/frequency location, a DMRS port index, a DMRS port group index, and a type of DMRS pattern (e.g., DMRS type 1 or DMRS type 2) for the PSSCH. In some implementations of the present disclosure, a UE may be configured with a DMRS setting table which is contained in a pre-configuration parameter (e.g., defined by the Third Generation Partnership Project (3GPP) technical specifications) or configured in an RRC configuration (e.g., an SL-RRC configuration or a Uu-RRC configuration) or contained in the system information broadcast by a BS.

An example of the DMRS setting table is as follows.

TABLE 1

| Index | Number of DMRS symbols | Type of DMRS pattern |
|---|---|---|
| 0 | 1 | 1 |
| 1 | 1 | 2 |
| 2 | 2 | 1 |
| 3 | 2 | 2 |
| 4 | 3 | 1 |
| . | . | . |
| . | . | . |
| . | . | . |
| 7 | 4 | 2 |

As shown in Table 1, the DMRS setting table may include several indices (e.g., eight indices) with each being associated with a DMRS setting (e.g., including the number of DMRS symbols and the type of DMRS pattern).

In some implementations of the present disclosure, the index of the DMRS setting for one or multiple PSSCHs may be indicated in an SCI message for a UE. In the multiple PSSCHs case, the multiple PSSCHs may include multiple PSSCH repetitions.

In some implementations of the present disclosure, several indices of the DMRS settings for one or multiple PSSCHs may be indicated in an SCI message for a UE, where the indices of the DMRS settings and the PSSCHs (if the number of PSSCH is plural) may have a one-to-one mapping relationship. For example, if an SCI message, which is transmitted over a PSCCH, contains two DMRS setting indices of "0" and "4," and the number of repetitions of the scheduling PSSCH is two, the UE may determine that the first DMRS setting for the first PSSCH repetition is to transmit one DMRS symbol with DMRS type 1, and the second DMRS setting for the second PSSCH repetition is to transmit three DMRS symbols with DMRS type 2.

In some implementations of the present disclosure, Tracking Reference Signal (TRS)-related information may be included in an SCI message (e.g., SCI format NR_V, SCI_NR_V) for the scheduling PSSCH. The TRS may be an RS used for fine time and frequency measurement of channel estimation. In some implementations of the present disclosure, the TRS-related information may include at least one of the following: a TRS exist indicator for indicating whether a TRS is transmitted in an SL physical channel (e.g., a PSCCH or a PSSCH), TRS sequence generation information, a TRS port index, and a TRS pattern (e.g., the time and frequency domain information of the TRS) for the PSSCH.

In some implementations of the present disclosure, the TRS-related information may include a TRS setting table which contains information related to the TRS settings. This DMRS setting table may be contained in a pre-configuration parameter which is defined by the 3GPP technical specifications, configured in an RRC configuration (e.g., an SL-RRC configuration or a Uu-RRC configuration), or contained in the system information broadcast by a BS.

In some implementations of the present disclosure, the SCI message may contain a priority indicator and/or a reliability indicator (e.g., a Prose Per Packet Reliability (PPPR)-related indicator or destination-Identity (ID)-related information). The UE may determine the TRS pattern, or the existence of the TRS, according to the priority indicator and/or the reliability indicator. For example, if an SCI message contains a reliability indicator of which the value exceeds a predefined, or RRC-configured, or BS-broadcast threshold, the UE may determine this packet of the SL service is relatively important. Hence, the UE may determine that there may be a TRS which is associated with the PSSCH scheduled by the SCI message, where the TRS pattern may be contained in a pre-configuration parameter (e.g., defined by the 3GPP technical specifications).

In some implementations of the present disclosure, PTRS-related information may be included in an SCI message for the scheduling PSSCH. The PTRS may be an RS used for phase tracking. In some implementations of the present disclosure, the PTRS-related information may include at least one of the following: a PTRS exist indicator for indicating whether a PTRS is transmitted in an SL physical channel (e.g., a PSSCH), PTRS sequence generation information, a PTRS port index, and a PTRS pattern (e.g., the time and frequency domain information of the PTRS) for the PSSCH.

In some implementations of the present disclosure, a UE may be configured with a PTRS setting table which may be contained in a pre-configuration parameter (e.g., defined by 3GPP technical specifications), or configured in an RRC configuration (e.g., an SL-RRC configuration or a Uu-RRC configuration), or contained in the system information broadcast by a BS. Similar to the DMRS setting table, the PTRS setting table may include one or more indices with each being associated with a particular PTRS setting. In some implementations of the present disclosure, the index of the PTRS setting for one or multiple PSSCHs (e.g., multiple PSSCH repetitions) may be indicated in the SCI message for the UE. In some other implementations, multiple indices of the PTRS settings for one or multiple PSSCHs (e.g., multiple PSSCH repetitions) may be indicated in the SCI message for the UE.

In some implementations of the present disclosure, a PSSCH, which is scheduled by a PSCCH, may apply the same TRS-related information indicated by the SCI message. In some implementations of the present disclosure, the SCI message may contain a priority indicator and/or a reliability indicator. The UE may determine the PTRS pattern, or the existence of the PTRS, according to the priority indicator and/or the reliability indicator. For example, if the SCI message contains a reliability indicator (e.g., a PPPR-related indicator or the destination-ID-related information) of which the value exceeds a predefined, or RRC-configured, or BS-broadcast, threshold, the UE may determine that this packet of the SL service is relatively important. Hence, the UE may determine that there may be a PTRS associated with the PSSCH scheduled by the SCI message, where the PTRS pattern may be contained in a pre-configuration parameter (e.g., defined by the 3GPP technical specifications).

In some implementations of the present disclosure, a UE may determine whether to transmit a PTRS, or whether there is an indicator/index for PTRS setting, based on the time/frequency location of the resource pool selected for transmission or reception. For example, if a DCI message indicates to a UE to transmit a PSCCH in a resource pool located in FR2, the UE may determine that there is a PTRS associated with a PSSCH. Conversely, if a DCI message indicates to a UE to transmit a PSCCH in a resource pool located in FR1, the UE may determine that there is no PTRS associated with the PSSCH.

In some implementations of the present disclosure, a UE may obtain an RS setting (e.g., a DMRS/PTRS/TRS setting) of each resource pool from an RRC configuration (e.g., an SL-RRC configuration or a Uu-RRC configuration) or a pre-configuration parameter or the BS-broadcast system information. The RS setting may include, for example, at least one of the following: sequence generation information, the number of symbols, a port index, a port group index, a type of pattern, and time/frequency domain resource location information.

In some implementations of the present disclosure, for a resource pool, the RS setting, which is obtained from an SCI message, may override the RS setting obtained from an RRC configuration (e.g., an SL-RRC configuration or a Uu-RRC configuration) or a pre-configuration parameter or BS-broadcast system information. For example, if the DMRS type configured in the RRC configuration (e.g., an SL-RRC configuration or a Uu-RRC configuration) for a resource pool is indicated as "type 1," the UE may transmit DMRSs using DMRS type 2, instead of using DMRS type 1, in the scheduling PSSCH when the UE receives an SCI message which indicates to the UE to apply DMRS type 2.

Synchronization Signals in V2X Communication Systems

In some implementations of the present disclosure, a UE in a V2X communication system may need to transmit synchronization signals autonomously. The synchronization signals may be transmitted in different beam directions and in different symbols within a synchronization signal periodicity, as shown in FIG. 2.

Figure 2:
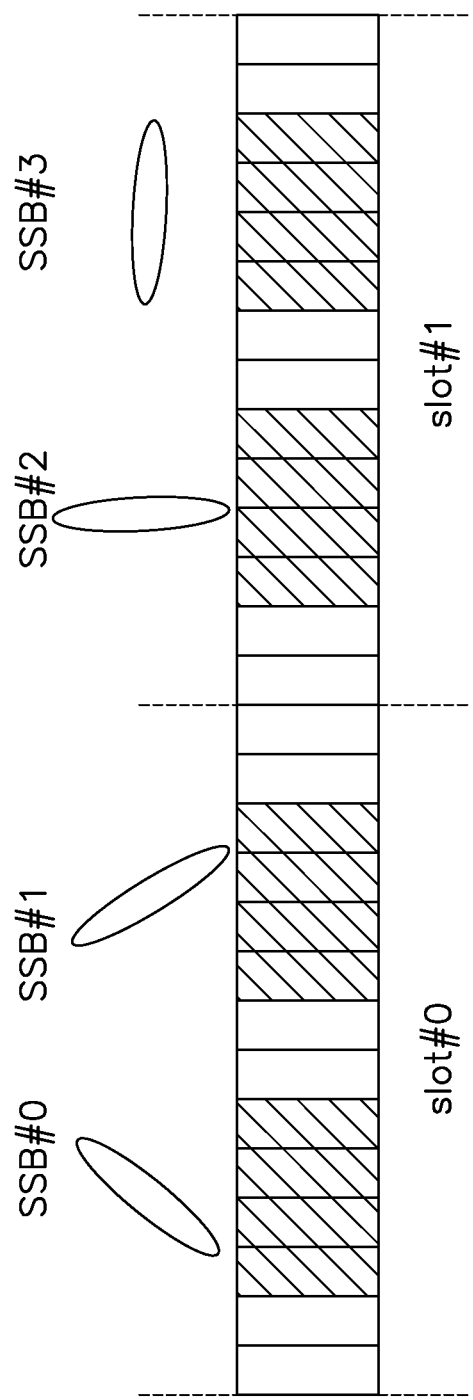
FIG. 2 is a schematic diagram illustrating a beam sweeping of a Synchronization Signal Block (SSB) transmission, in accordance with example implementations of the present disclosure.

FIG. 2 is a schematic diagram illustrating a beam sweeping of an SSB transmission, in accordance with example implementations of the present disclosure. As shown in FIG. 2, SSB #0, SSB #1, SSB #2 and SSB #3 are transmitted in different beam directions and in different symbols of slots #0 and #1. In some cases, this kind of SSB beam sweeping may cause an increase of Channel Busy Ratio (CBR), and it may result in unavailability of the resource pools (e.g., for transmission) after the UE performs sensing. Hence, some implementations of the present disclosure may provide a beam operation indicator to indicate whether a UE needs to transmit beam sweeping synchronization SSBs in a PC5 channel (e.g., a PSSCH or a PSCCH). For example, if the beam operation indicator is set to a first value (e.g., "1"), the UE may transmit a beam sweeping synchronization SSB(s), whereas if the beam operation indicator is set to a second value (e.g., "0"), the UE may not transmit the beam sweeping synchronization SSB(s).

In some implementations of the present disclosure, the beam operation indicator may be configured in an RRC configuration (e.g., an SL-RRC configuration or a Uu-RRC configuration), or contained in a pre-configuration parameter (e.g., defined by 3GPP technical specifications), or the BS-broadcast system information. The beam operation indicator may be configured per a resource pool basis or per an anchor carrier basis. For example, if the beam operation indicator is set to "1" for resource pool #1, then the UE may transmit synchronization signals in one synchronization signal periodicity (if the UE can perform transmission on the PSSCH of resource pool #1). In some implementations of the present disclosure, the beam operation indicator may be transmitted in UE-broadcast system information (e.g., a Master Information Block-Sidelink (MIB-SL), or transmitted in a Sidelink System Information Block (SIB-SL)). It should be noted that the MIB-SL may be referred to as a MIB for LTE-V2X or a MIB for NR-V2X (e.g., MIB-NR-V2X). In some implementations of the present disclosure, the UE-broadcast system information may be associated with each synchronization signal in the synchronization signal periodicity. In some implementations of the present disclosure, the UE-broadcast system information may be only associated with one synchronization signal, even though there are multiple synchronization signals in one synchronization signal periodicity.

In some implementations of the present disclosure, the time/frequency location of a MIB-SL may be contained in a pre-configuration parameter (e.g., defined by 3GPP technical specifications). For example, if there are four synchronization signals in one synchronization signal periodicity, the UE may transmit the MIB-SL only in the first synchronization signal within the synchronization signal periodicity based on a predefined rule.

In some implementations of the present disclosure, the beam operation indicator may be contained in a DCI message (e.g., DCI_NR_V), and the UE may determine whether to perform a multiple beam operation based on the beam operation indicator. For example, if the UE is indicated (by the beam operation indicator) to perform a multiple beam operation, the UE may transmit multiple beam sweeping synchronization SSBs (e.g., including at least one Sidelink Synchronization Signal (SLSS) and at least one MIB-SL) in a PC5 channel(s) within an SS transmission periodicity. In contrast, if the UE is indicated not to perform the multiple beam operation, the UE may transmit only one SSB within an SS transmission periodicity.

In some implementations of the present disclosure, the beam operation indicator may be included in a resource pool configuration which is contained in a pre-configuration parameter or configured by a BS. The UE may obtain the beam operation indicator from the resource pool configuration. The UE may then determine whether to perform a multiple beam operation on a resource pool associated with the resource pool configuration indicated by the beam operation indicator. In some implementations of the present disclosure, the multiple beam operation may include the UE determining that a spatial-domain-filter-related Information Element (IE) is contained in an SCI message or a DCI message. In some implementations of the present disclosure, the multiple beam operation may further include the UE identifying the existence of multiple beam synchronization SSBs.

In some implementations of the present disclosure, the UE may report the capability of performing the multiple beam operation to the BS (e.g., in the SidelinkUEInformation IE of an SL-RRC configuration or a Uu-RRC configuration). The capability of performing the multiple beam operation may be reported by the UE per a resource pool basis or per an anchor carrier basis. For example, if the capability of multiple beam operation in the SidelinkUEInformation IE is set to "1" (or "11"), the UE may transmit the capability of multiple beam operation to the BS to inform the BS that the UE is capable of performing a multiple beam operation in both of resource pool #1 and resource pool #2 (if the resource pool #1 and the resource pool #2 are selected for transmission or reception). Similarly, if the capability of multiple beam operation in the SidelinkUEInformation IE is set to "01," the UE may transmit the capability of multiple beam operation to the BS to inform the BS that the UE is capable of performing the multiple beam operation only in resource pool #1 (if both of resource pool #1 and resource pool #2 are selected for transmission or reception). It should be noted that in this example, the rightmost bit ("1") of the capability of multiple beam operation ("01") corresponds to resource pool #1 and the leftmost bit ("0") of the capability of multiple beam operation ("01") corresponds to resource pool #2.

In some implementations of the present disclosure, the UE may obtain a mapping table which is contained in a pre-configuration parameter (e.g., defined by 3GPP technical specifications), or configured by a BS (e.g., contained in an RRC configuration (e.g., an SL-RRC configuration or a Uu-RRC configuration), or BS-broadcast system information). The mapping table may be used for indicating where an SSB (e.g., for a PC5 channel) is transmitted in a synchronization signal periodicity. In some implementations of the present disclosure, the mapping table may be configured per a resource pool basis or per an anchor carrier basis.

In some implementations of the present disclosure, the UE may obtain a particular indicator which is contained in a pre-configuration parameter (e.g., defined by 3GPP technical specifications) or configured by a BS. The particular indicator may be used for indicating the UE whether to transmit a plurality of SSBs in a synchronization signal periodicity.

In some implementations of the present disclosure, if there is no mapping table (e.g., no bit map) in the RRC configuration (e.g., the SL-RRC configuration or the Uu-RRC configuration), or the pre-configuration parameter, or the BS-broadcast system information, for a resource pool or an anchor carrier, the UE may determine that there is no beam sweeping synchronization SSB in this resource pool or anchor carrier. In some implementations of the present disclosure, the mapping table may indicate the time/frequency location for each synchronization signal. The time/ frequency location of each synchronization signal may be represented in a symbol level, a slot level, or a subframe level, depending on the configured granularity of the time location.

Figure 3:
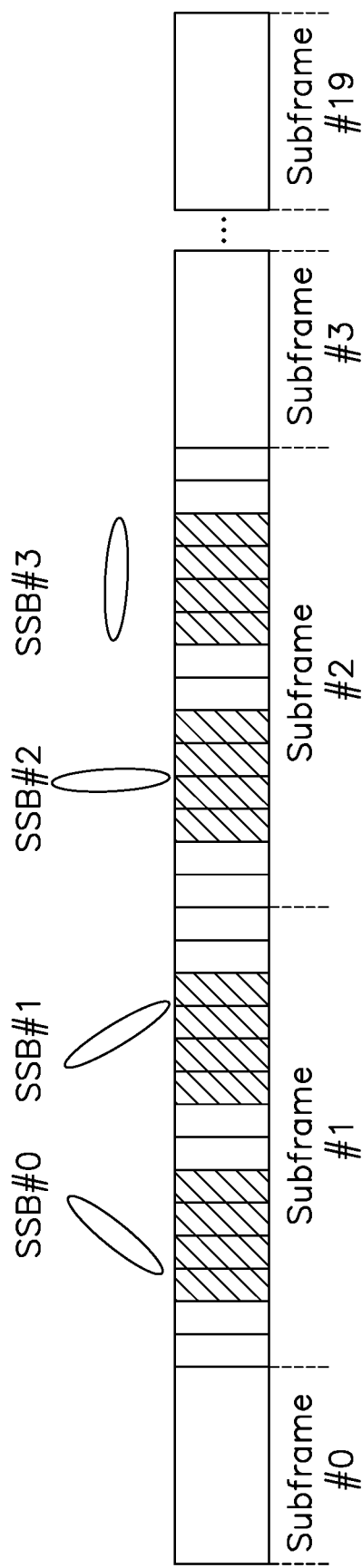
FIG. 3 is a schematic diagram illustrating a beam sweeping of an SSB transmission, in accordance with example implementations of the present disclosure.

FIG. 3 is a schematic diagram illustrating a beam sweeping of an SSB transmission, in accordance with example implementations of the present disclosure. As noted above, a UE may know where an SSB is transmitted in a synchronization signal periodicity according to the mapping table. As shown in FIG. 3, if the mapping table contains a bit map of 20 bits of "01100 00000 00000 00000," with each bit representing one subframe and the synchronization signal periodicity being 20 millisecond (ms), then the UE may know that in a synchronization signal periodicity which consists of 20 subframes #0 to #19, the synchronization signals (e.g., SSBs #0 to #3) may be transmitted only in the second and third subframes (e.g., subframe #1 and subframe #2). In some implementations of the present disclosure, the mapping table may be transmitted in a MIB-SL. It should be noted that although in FIG. 3 each bit of the bit map of the mapping table is corresponding to one subframe, it is only for illustrative purposes, and not intended to limit the scope of the present invention. For example, each bit of the bit map of the mapping table may be corresponding to one subframe or one symbol, depending on the granularity of the time location.

In some implementations of the present disclosure, the PSCCH transmissions may be associated with the synchronization signal transmissions. For example, a UE may know where to transmit or receive the PSCCH(s) and/or the synchronization signal(s) based on the time/frequency location of the synchronization signal(s) and/or PSCCH(s), as shown in FIG. 4.

Figure 4:
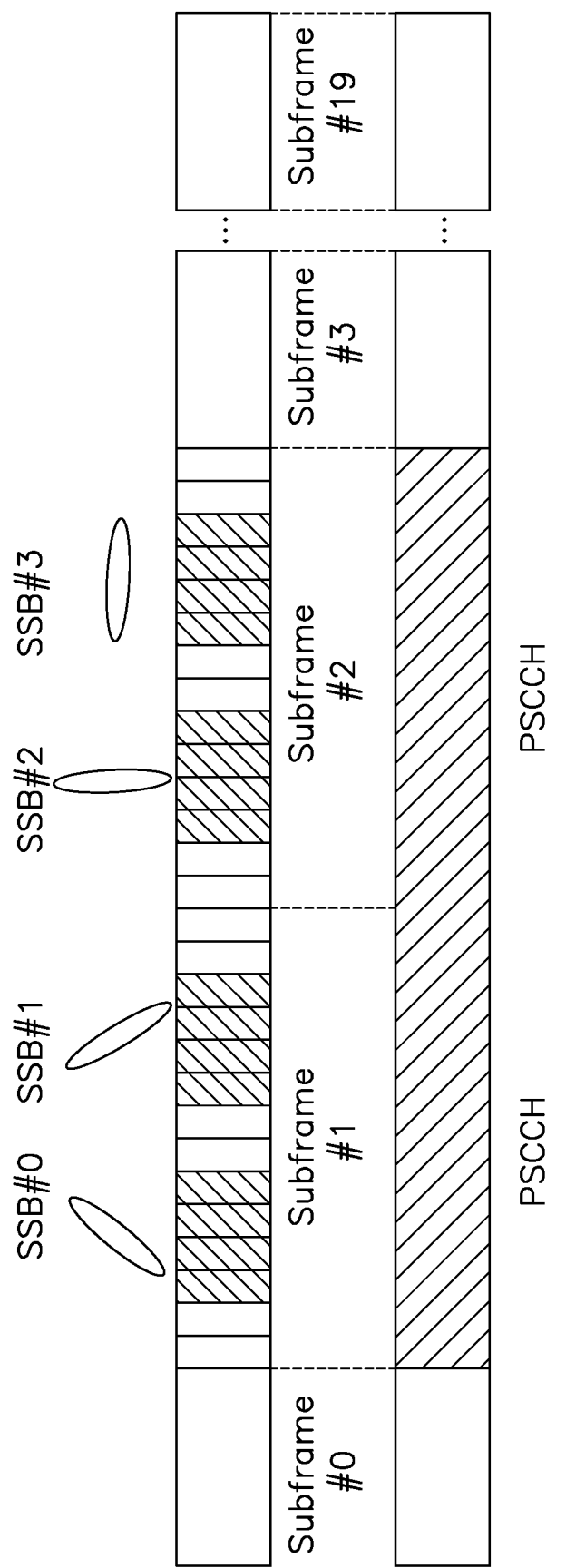
FIG. 4 is a schematic diagram illustrating a beam sweeping of an SSB transmission, in accordance with example implementations of the present disclosure.

FIG. 4 is a schematic diagram illustrating a beam sweeping of an SSB transmission, in accordance with example implementations of the present disclosure. As shown in FIG. 4, if a UE receives a mapping table which reveals that the synchronization signals will be transmitted in subframe #1 and subframe #2, the UE may determine that the PSCCH transmissions may appear in the subchannel(s) within subframe #1 and subframe #2.

In some implementations of the present disclosure, different beam directions may be respectively associated with several independent resource pools and/or independent sets of subchannels. For example, multiple resource pools and/or sets of subchannels may be associated with different RSs (e.g., corresponding to different RS indices, different RS types, or different spatial domain filters for receiving the RSs). In some implementations of the present disclosure, the association between the beam directions and the resource pools or subchannels may be obtained from a SIB (e.g., SIB-V2X) or a MIB (e.g., MIB-SL). For example, if a UE receives a MIB which is associated with synchronization signal #1, the UE may determine that the set of subchannels indicated by the MIB may be transmitted or received by the same spatial domain filter as the filter for receiving synchronization signal #1. In some implementations of the present disclosure, if a UE receives information on multiple subchannels which are associated with different RSs and a portion of these subchannels locates in the same time domain resource, the UE may determine which spatial domain filter to use in the overlapped time domain resource based on UE implementation.

In some implementations of the present disclosure, a UE may perform beam-based sensing to determine whether to transmit a PSSCH in a resource pool or whether to transmit a measurement report to a BS. For example, for a PSSCH CBR measurement, a UE may only monitor certain subchannel(s) in a resource pool. These monitored subchannels may be associated with a UE-selected RS. For example, the monitored subchannels may be indicated by a MIB which is associated with a specific synchronization signal. In some implementations of the present disclosure, the CBR may be defined as the proportion of subchannels where the Sidelink Received Signal Strength Indicator (S-RSSI) sensed by the UE over subframes [n-a, n-b] exceeds a (pre-)configured threshold. Hence, if a UE selects more than one synchronization signal in a resource pool, each synchronization signal may be used to generate one sensing result based on different spatial domain filters.

In some implementations of the present disclosure, a BS may use beam-related information (e.g., an RS index) to indicate to a UE to generate a measurement report for a specific set of subchannels. For example, the BS may configure one or more RSs in a measurement object of a measurement configuration, and the UE may only monitor the subchannels which are associated with the configured RS(s). In some implementations of the present disclosure, the UE may obtain the information of the subchannels from a MIB-NR-V2X or a SIB-V2X which is associated with the configured RSs. In some implementations of the present disclosure, the information of the association between the RS(s) and the subchannel(s) may be contained in a MIB-NR-V2X or a SIB-V2X.

Techniques related to the reliability mechanism of a V2X communication system are now described in the following.

Repetition Transmission of PSCCH and/or PSSCH

In some implementations of the present disclosure, an SCI message (e.g., the SCI format NR_V or the SCI_NR_V) may contain channel repetition information which may indicate at least one of the following: the number of repetitions of an SL physical channel, a time gap between two adjacent repetitions of the SL physical channel, and a spatial domain filter for receiving at least one repetition of the SL physical channel. The SL physical channel may be a PSSCH or a PSCCH.

For example, if an SCI message indicates that the number of repetitions of a scheduling PSSCH is "four," the UE may, upon receiving the SCI message in a PSCCH, know that there will be four PSSCH repetitions scheduled by this PSCCH. In some implementations of the present disclosure, the time gap between two adjacent transmissions of the SCI message (e.g., the initial transmission of the SCI message and the first retransmission of the SCI message) may be used as the time gap between two adjacent PSSCH repetitions.

In some implementations of the present disclosure, the SCI message may indicate one spatial domain filter or one QCL information indication for receiving one or more PSSCHs. For example, if the SCI message indicates a spatial domain filter of "RS #2" and the number of repetitions of the PSSCH is "four," the UE may determine that there are four PSSCH repetitions (e.g., including one PSSCH transmission and three PSSCH retransmissions), where each PSSCH repetition may apply the same spatial domain filter as applied for receiving RS #2.

In some implementations of the present disclosure, the SCI message may indicate multiple spatial domain filters, or QCL information indications, for each PSSCH repetition, where the number (e.g., N1) of the spatial domain filters, or QCL information indications, may be less than or equal to the number (e.g., N2) of repetitions of the PSSCH. If these two numbers are equal (e.g., N1=N2), the UE may determine that the spatial domain filters and the PSSCH repetitions have a one-to-one mapping relationship. Conversely, if these two numbers are different (e.g., N1<N2), the UE may determine that the spatial domain filters may be applied to the PSSCH repetitions equally. For example, if the SCI message indicates two spatial domain filters of "RS #2" and RS #3," and also indicates that the number of PSSCH repetitions is "four," the first two PSSCH repetitions may be received or transmitted based on the spatial domain filter of "RS #2" and the other two PSSCH repetitions may be received or transmitted based on the spatial domain filter of "RS #3."

In some implementations of the present disclosure, the UE may obtain a resource pool configuration which is contained in a pre-configuration parameter or configured by a BS. The resource pool configuration may indicate the number of repetitions of an SL physical channel.

MCS Table for PSSCH Indicated in PSCCH

In some implementations of the present disclosure, an SCI message may include an MCS table indicator. A UE may select an MCS table for the modulation or coding of an SL physical channel based on the MCS table indicator. For example, the UE may perform modulation and coding for an SL physical channel (e.g., a PSSCH) based on a first MCS table when the MCS table indicator is set to a first value (e.g., a bit value of "0"), and perform modulation and coding for the SL physical channel based on a second MCS table when the MCS table indicator is set to a second value (e.g., a bit value of "1"). The first MCS table and the second MCS table may correspond to different reliability levels of channel modulation and coding. For example, the first MCS table may be a normal reliability MCS table and the second MCS table may be a high reliability MCS table. In some implementations of the present disclosure, the MCS index may be indicated by the same PSCCH as the MCS table indicator. For example, if the MCS table indicator is set to "1" and the MCS index is "12", the UE may determine that the PSSCH scheduled by the PSCCH may be modulated based on the second MCS table (corresponding to the second value "1"), and the UE may use the MCS index of "12" in the second MCS table to demodulate the PSSCH.

Techniques related to the resource pool configuration of a V2X communication system are now described in the following.

Beam Operation-Specific Resource Pool

In some implementations of the present disclosure, each resource pool configuration may contain a resource pool indication (e.g., a one-bit indicator or a mapping table) to indicate whether the corresponding resource pool supports or includes a multiple beam operation. If a resource pool indication reveals that there is no multiple beam operation in the corresponding resource pool, the UE may not expect any multiple beam operation in this resource pool.

In some implementations of the present disclosure, the UE may determine that there is only one synchronization signal in a synchronization signal periodicity. The UE may expect that the DCI message (e.g., DCI_NR_V) and/or the SCI message (e.g., SCI_NR_V) may not contain any bitfield related to the spatial domain filter or beam information.

In some implementations of the present disclosure, the UE may determine whether to perform a multiple beam operation on a resource pool based on a frequency range of an anchor carrier of the resource pool. In such implementations, the resource pool configuration may not contain an explicit indicator (e.g., the resource pool indication) for indicating the beam-related information. Instead, the beam operation may be related to the anchor carrier of each resource pool or the operated frequency range. For example, if a resource pool is configured in carrier #1 in FR1 (e.g., below 6 GHz), this resource pool may not have a beam operation.

In some implementations of the present disclosure, a UE may determine whether to use at least one beam-operation-specific resource pool based on the sensing result or measurement result. For example, if the measurement result (e.g., Reference Symbol Received Power (RSRP) or Received Signal Strength Indication (RSSI)) of an SL physical channel (e.g., a PSSCH or a PSCCH) is below a threshold, the UE may only select the beam operation-specific resource pool for transmission. In some of the present implementations, the beam-operation-specific resource may be a resource pool for which the UE is only allowed to apply the beam operation, and there may be no beam operation indicator in such a resource pool.

In some implementations of the present disclosure, a UE may determine whether to use the beam operation-specific resource pool based on the UE speed (e.g., kilometer per hour information) and/or the mobility state (e.g., the normal-mobility/medium-mobility/high-mobility state). For example, if the mobility state of the UE is indicated as "high mobility" when the UE performs resource selection, the UE may not select a beam operation-specific resource pool for transmission.

High-Reliability-Specific or Low-Latency-Specific Resource Pool

In some implementations of the present disclosure, a few of resource pools may only be allocated for high reliability or low latency use cases. In such implementations of the present disclosure, an independent resource pool configuration for high reliability or low latency may be used. This independent resource pool configuration may be configured in an RRC configuration (e.g., an SL-RRC configuration or a Uu-RRC configuration), or contained in a pre-configuration parameter, or carried by system information broadcasted by a BS. In some implementations of the present disclosure, for a resource pool of high reliability, a few of bitfields in the corresponding resource pool configuration may be used for improving the reliability. For example, the resource pool configuration may contain a bitfield indicating the number of repetitions for an SL physical channel (e.g., a PSCCH or a PSSCH). In another example, for a resource pool of high reliability, the UE may apply a default number of repetitions for a PSCCH and/or a PSSCH. The default number may be two, four, or more than four, for example. On the other hand, for a resource pool of low latency, the corresponding resource pool configuration may include a few of bitfields used for reducing the latency. For example, the resource pool configuration may include a bitfield indicating the number of symbols per slot of an SL physical channel. In some implementations of the present disclosure, the UE may determine that in a resource pool of low latency, the number of symbols per slot of an SL physical channel may be determined by the UE by default. This default number may be less than 14 symbols (e.g., two, four or seven symbols), for example.

Resource Pool Selection Due to RX Antenna Limitation

In some cases, because beam operations may be applied in NR V2X communications, analog beamforming antenna(s) may be needed. Moreover, NR V2X communications may share the same RF module (e.g., the same RX antenna) for different RATs (e.g., NR and LTE) because the data channel and/or the control channel of different RATs may coexist in the same/similar operation band. However, the number of RX beam directions of a UE for simultaneous reception may be limited by the number of phase filters of the RF module. Hence, In some implementations of the present disclosure, a UE may determine which physical channel (e.g., a PSSCH, a PSCCH, a Physical Downlink Control Channel (PDCCH) or a Physical Downlink Shared Channel (PDSCH)) to be received when multiple physical channels of different RATs are overlapped in the time domain.

In some implementations of the present disclosure, UE capability may indicate whether a UE supports simultaneous reception of different RATs (e.g., NR, LTE, LYE-V2X and NR-V2X). For example, for a UE which supports multiple RX spatial domain filters, the UE may report its UE capability to the BS and receive multiple physical channels of different RATs without dropping any physical channel transmission. In some implementations of the present disclosure, the UE capability may be implemented as a true/false indicator (e.g., "true" means the UE supports the simultaneous reception of different RATs, whereas "false" UE does not support the simultaneous reception of different RATs). In another example, the UE capability may be implemented as a parameter which represents the maximum number of RX beam directions supported by the UE. For example, when the UE capability is set to "three," it means that the UE can receive three physical channels at the same time. In such a case, if there are more than three physical channels overlapped in the time domain, the UE may follow a priority rule to select the physical channel(s) to receive.

In some implementations of the present disclosure, the priority rule may depend on the resource pool where the UE monitors the SCI message. For example, if the resource pool configuration of the monitored resource pool contains an indication for high reliability or low latency use cases (e.g., a high reliability indicator, a low latency indicator, or a priority order which exceeds a threshold), the UE may determine that the reception of the SL physical channels and RSs may have a higher priority than that of the Uu physical channels and RSs. Otherwise, if the resource pool configuration of the monitored resource pool does not contain the indication for high reliability or low latency use cases, the UE may determine that the reception of the Uu physical channels and RSs has a higher priority than the reception of the SL physical channels and RSs.

Figure 5:
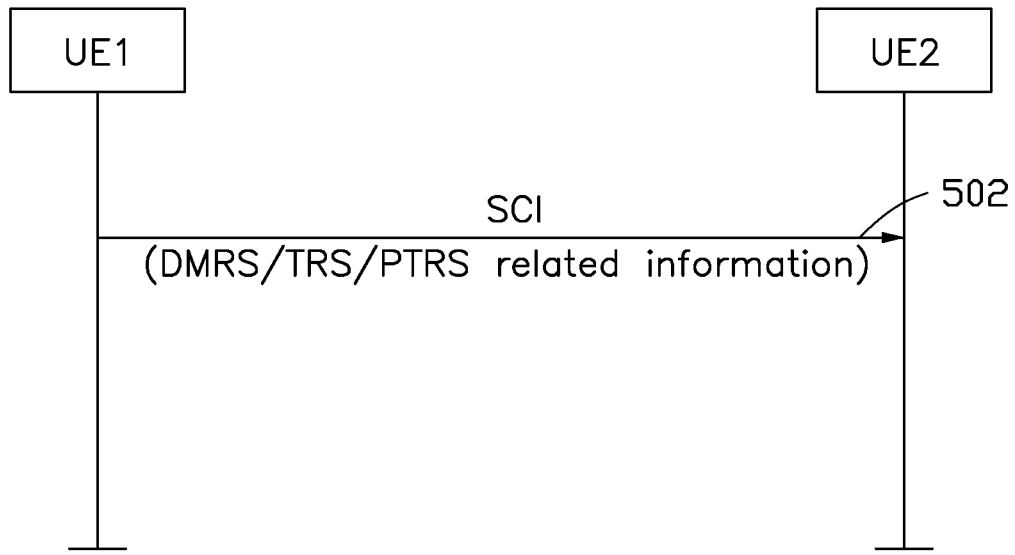
FIG. 5 is a schematic diagram illustrating the signaling process between multiple UEs, in accordance with example implementations of the present disclosure.

FIG. 5 is a schematic diagram illustrating the signaling process between multiple UEs, in accordance with example implementations of the present disclosure. As shown in FIG. 5, the first UE (e.g., UE1) may communicate directly with the second UE (e.g., UE2) via an SL connection (e.g., a PC5 interface). In action 502, the UE1 may transmit an SCI message to the UE2. The SCI message may include RS settings for the SL connection between the UE1 and UE2. For example, the SCI message may include at least one of the DMRS related information, TRS related information, and PTRS related information, for the SL connection. In some implementations of the present disclosure, the DMRS related information may include at least one of the following: DMRS sequence generation information, the number of DMRSs, a DMRS time/frequency location, a DMRS port index, a DMRS port group index, and a type of DMRS pattern. In some implementations of the present disclosure, the TRS related information may include at least one of the following: a TRS exist indicator for indicating whether a TRS in transmitted in an SL physical channel, TRS sequence generation information, a TRS port index, and a TRS pattern. In some implementations of the present disclosure, the PTRS may include at least one of the following: a PTRS exist indicator for indicating whether a PTRS is transmitted in an SL physical channel, PTRS sequence generation information, a PTRS port index, and a PTRS pattern.

Figure 6:
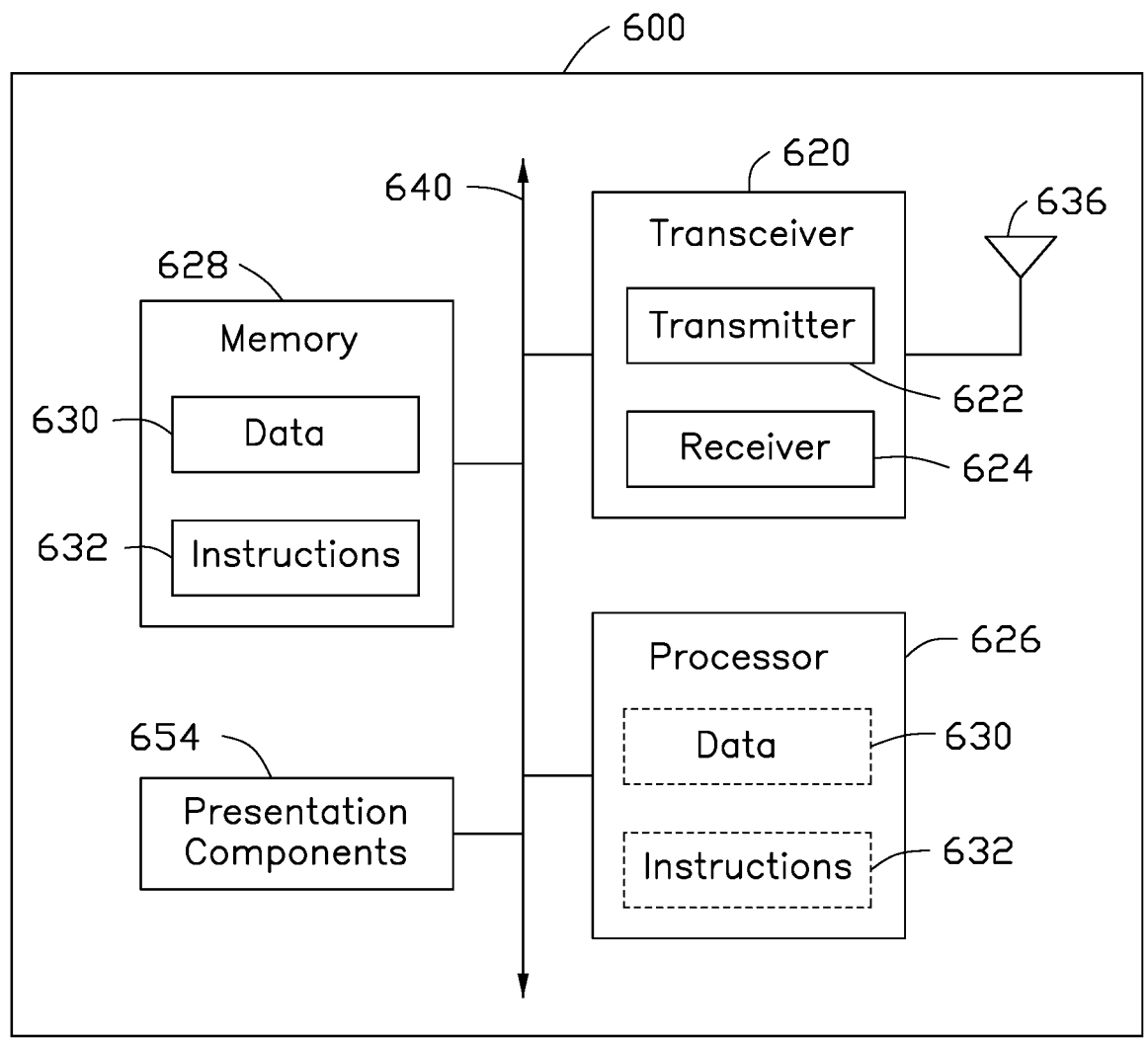
FIG. 6 is a block diagram illustrating a node for wireless communication, in accordance with various aspects of the present disclosure.

FIG. 6 is a block diagram illustrating a node for wireless communication, in accordance with various aspects of the present application. As shown in FIG. 6, a node 600 may include a transceiver 620, a processor 626, a memory 628, one or more presentation components 654, and at least one antenna 636. The node 600 may also include an RF spectrum band module, a BS communications module, a network communications module, and a system communications management module, Input/Output (I/O) ports, I/O components, and power supply (not explicitly shown in FIG. 6). Each of these components may be in communication with each other, directly or indirectly, over one or more buses 640. In one implementation, the node 600 may be a UE or a BS that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 628 may include computer-storage media in the form of volatile and/or non-volatile memory. The memory 628 may be removable, non-removable, or a combination thereof. Example memory includes solid-state memory, hard drives, optical-disc drives, etc. As illustrated in FIG. 6, The memory 628 may store computer-readable, computer-executable instructions 632 (e.g., software codes) that are configured to, when executed, cause the processor 626 to perform various functions described herein, for example, with reference to FIGS. 1 through 5. Alternatively, the instructions 632 may not be directly executable by the processor 626 but be configured to cause the node 600 (e.g., when compiled and executed) to perform various functions described herein.

The processor 626 (e.g., having processing circuitry) may include an intelligent hardware device, e.g., a Central Processing Unit (CPU), a microcontroller, an ASIC, etc. The processor 626 may include memory. The processor 626 may process the data 630 and the instructions 632 received from the memory 628, and information through the transceiver 620, the base band communications module, and/or the network communications module. The processor 626 may also process information to be sent to the transceiver 620 for transmission through the antenna 636, to the network communications module for transmission to a core network.

One or more presentation components 654 presents data indications to a person or other device. Examples of presentation components 654 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the implementations described above, but many rearrangements, modifications, and substitutions are possible without departing from the scope of the present disclosure.

What is claimed is:

1. A user equipment (UE) comprising:
   one or more non-transitory computer-readable media having computer-executable instructions embodied thereon; and
   at least one processor coupled to the one or more non-transitory computer-readable media, and configured to execute the computer-executable instructions to:
   receive a Radio Resource Control (RRC) configuration for configuring the UE with a plurality of types of Demodulation Reference Signal (DMRS) patterns;
   receive a Sidelink Control Information (SCI) message comprising DMRS-related information, the DMRS-related information indicating one of the plurality of types of DMRS patterns; and
   perform a Physical Sidelink Shared Channel (PSSCH) transmission according to the one of the plurality of types of DMRS patterns indicated by the SCI message.

2. The UE of claim 1, wherein the SCI message further comprises Tracking Reference Signal (TRS) related information which includes at least one of:
   a TRS exist indicator for indicating whether a TRS is transmitted in a sidelink (SL) physical channel,
   TRS sequence generation information,
   a TRS port index, and
   a TRS pattern.

3. The UE of claim 1, wherein the SCI message further comprises Phase Tracking Reference Signal (PTRS) related information which includes at least one of:
   a PTRS exist indicator for indicating whether a PTRS is transmitted in a sidelink (SL) physical channel,
   PTRS sequence generation information,
   a PTRS port index, and
   a PTRS pattern.

4. The UE of claim 1, wherein the SCI message further comprises channel repetition information which indicates at least one of:
   a number of repetitions of a sidelink (SL) physical channel,
   a time gap between two adjacent repetitions of the SL physical channel, and
   a spatial domain filter for receiving at least one repetition of the SL physical channel.

5. The UE of claim 4, wherein the SL physical channel is one of a PSSCH and a Physical Sidelink Control Channel (PSCCH).

6. The UE of claim 1, wherein the at least one processor is further configured to execute the computer-executable instructions to:
   obtain a resource pool configuration which is contained in a pre-configuration parameter or configured by a base station,
   wherein the resource pool configuration indicates a number of repetitions of an SL physical channel.

7. The UE of claim 1, wherein the at least one processor is further configured to execute the computer-executable instructions to:
   obtain a particular indicator which is contained in a pre-configuration parameter or configured by a base station, wherein the particular indicator is used for indicating to the UE whether to transmit a plurality of Synchronization Signal Blocks (SSBs) in a synchronization signal periodicity.

8. The UE of claim 1, wherein the at least one processor is further configured to execute the computer-executable instructions to:
   obtain a mapping table which is contained in a pre-configuration parameter or configured by a base station, wherein the mapping table is used for indicating where a Synchronization Signal Blocks (SSB) is transmitted in a synchronization signal periodicity.

9. The UE of claim 1, wherein the at least one processor is further configured to execute the computer-executable instructions to:
   obtain a beam operation indicator contained in a resource pool configuration which is contained in a pre-configuration parameter or configured by a base station; and
   determine, based on the beam operation indicator, whether to perform a multiple beam operation on a resource pool associated with the resource pool configuration,
   wherein the multiple beam operation includes determining that a spatial-domain-filter-related Information Element (IE) is contained in the SCI message.

10. The UE of claim 1, wherein the at least one processor is further configured to execute the computer-executable instructions to:
    determine whether to perform a multiple beam operation on a resource pool based on a frequency range of an anchor carrier of the resource pool.

11. The UE of claim 1, wherein the SCI message further comprises a Modulation and Coding Scheme (MCS) table indicator, and the at least one processor is further configured to execute the computer-executable instructions to:
    perform modulation and coding for an SL physical channel based on a first MCS table when the MCS table indicator is set to a first value; and
    perform modulation and coding for the SL physical channel based on a second MCS table when the MCS table indicator is set to a second value.

12. A method performed by a user equipment (UE), the method comprising:
- receiving a Radio Resource Control (RRC) configuration for configuring the UE with a plurality of types of Demodulation Reference Signal (DMRS) patterns;
- receiving a Sidelink Control Information (SCI) message comprising DMRS-related information, the DMRS-related information indicating one of the plurality of types of DMRS patterns; and
- performing a Physical Sidelink Shared Channel (PSSCH) transmission according to the one of the plurality of types of DMRS patterns indicated by the SCI message.

13. The method of claim 12, wherein the SCI message further comprises Tracking Reference Signal (TRS) related information which includes at least one of:
- a TRS exist indicator for indicating whether a TRS is transmitted in a sidelink (SL) physical channel,
- TRS sequence generation information,
- a TRS port index, and
- a TRS pattern.

14. The method of claim 12, wherein the SCI message further comprises Phase Tracking Reference Signal (PTRS) related information which includes at least one of:
- a PTRS exist indicator for indicating whether a PTRS is transmitted in a sidelink (SL) physical channel,
- PTRS sequence generation information,
- a PTRS port index, and
- a PTRS pattern.

15. The method of claim 12, wherein the SCI message further comprises channel repetition information which indicates at least one of:
- a number of repetitions of a sidelink (SL) physical channel,
- a time gap between two adjacent repetitions of the SL physical channel, and
- a spatial domain filter for receiving at least one repetition of the SL physical channel.

16. The method of claim 15, wherein the SL physical channel is one of a PSSCH and a Physical Sidelink Control Channel (PSCCH).

17. The method of claim 12, further comprising:
- obtaining a resource pool configuration which is contained in a pre-configuration parameter or configured by a base station,
- wherein the resource pool configuration indicates a number of repetitions of a sidelink (SL) physical channel.

18. The method of claim 12, further comprising:
- obtaining a particular indicator which is contained in a pre-configuration parameter or configured by a base station, wherein the particular indicator is used for indicating to the UE whether to transmit a plurality of Synchronization Signal Blocks (SSBs) in a synchronization signal periodicity.

19. The method of claim 12, further comprising:
- obtaining a mapping table which is contained in a pre-configuration parameter or configured by a base station, wherein the mapping table is used for indicating where a Synchronization Signal Block (SSB) is transmitted in a synchronization signal periodicity.

20. The method of claim 12, further comprising:
- obtaining a beam operation indicator contained in a resource pool configuration which is contained in a pre-configuration parameter or configured by a base station; and
- determining, based on the beam operation indicator, whether to perform a multiple beam operation on a resource pool associated with the resource pool configuration,
- wherein the multiple beam operation includes determining that a spatial-domain-filter-related Information Element (IE) is contained in the SCI message.

21. The method of claim 12, further comprising:
- determining whether to perform a multiple beam operation on a resource pool based on a frequency range of an anchor carrier of the resource pool.

22. The method of claim 12, wherein the SCI message further comprises a Modulation and Coding Scheme (MCS) table indicator, and the method further comprises:
- performing modulation and coding for a sidelink (SL) physical channel based on a first MCS table when the MCS table indicator is set to a first value; and
- performing modulation and coding for the SL physical channel based on a second MCS table when the MCS table indicator is set to a second value.

* * * * *